US008040874B2

(12) United States Patent
Skog et al.

(10) Patent No.: US 8,040,874 B2
(45) Date of Patent: Oct. 18, 2011

(54) METHOD AND COMMUNICATION SYSTEM FOR AUTOMATICALLY DISCOVERING THE COMMON MULTIMEDIA SERVICE CAPABILITY

(75) Inventors: Robert Skog, Hässelby (SE); Peter Bleckert, Uppsala (SE); Mats Stille, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 509 days.

(21) Appl. No.: 10/584,861

(22) PCT Filed: Dec. 30, 2003

(86) PCT No.: PCT/SE03/02098
§ 371 (c)(1),
(2), (4) Date: Jun. 28, 2006

(87) PCT Pub. No.: WO2005/064957
PCT Pub. Date: Jul. 14, 2005

(65) Prior Publication Data
US 2007/0165599 A1    Jul. 19, 2007

(51) Int. Cl.
*H04L 12/66* (2006.01)

(52) U.S. Cl. ........ 370/352; 370/240; 370/260; 370/271; 370/410; 370/401; 370/395.2; 379/114.28; 379/114.29; 379/201.01; 379/202.01; 379/207.02; 379/221.08

(58) Field of Classification Search .................... None
See application file for complete search history.

(56) References Cited

U.S. PATENT DOCUMENTS

| | | | | |
|---|---|---|---|---|
| 5,689,553 A * | 11/1997 | Ahuja et al. | ............ | 379/202.01 |
| 6,161,008 A | 12/2000 | Lee et al. | | |
| 6,345,239 B1 * | 2/2002 | Bowman-Amuah | ............. | 703/6 |
| 6,430,174 B1 * | 8/2002 | Jennings et al. | ............. | 370/352 |
| 6,577,718 B1 * | 6/2003 | Kalmanek et al. | ....... | 379/114.22 |
| 6,587,861 B2 * | 7/2003 | Wakai et al. | .................. | 715/209 |
| 6,633,871 B1 * | 10/2003 | Jeyachandran et al. | ............... | 1/1 |
| 6,640,248 B1 | 10/2003 | Jorgensen | | |
| 6,661,785 B1 * | 12/2003 | Zhang et al. | .................. | 370/352 |
| 6,751,459 B1 * | 6/2004 | Lee et al. | ...................... | 455/445 |
| 7,031,706 B2 * | 4/2006 | Tuohimetsa et al. | ........ | 455/432.3 |
| 7,200,390 B1 * | 4/2007 | Henager et al. | ............... | 455/419 |
| 7,236,787 B1 * | 6/2007 | Tamura et al. | ................ | 455/437 |
| 7,251,317 B1 * | 7/2007 | Robbins et al. | .......... | 379/114.21 |

(Continued)

OTHER PUBLICATIONS

International Search Report for PCT/SE2003/002098 dated Aug. 2, 2004.

*Primary Examiner* — Hassan Phillips
*Assistant Examiner* — Ajay Cattungal
(74) *Attorney, Agent, or Firm* — Nixon & Vanderhye P.C.

(57) ABSTRACT

A method, a system, a server, and a computer program product are provided for Multimedia Capability discovery of different user terminals. Unnecessary use of the radio interface is avoided based on a network storage, which is accessible without registration to find out about the calling as well as the called user's multimedia capabilities during a voice call. If there is a positive capability discovery result out of this for both users, the system sends a message to each of the user terminals that they should notify the users, e.g., by displaying an icon above a soft button. There is no need for establishing a packet switched session, which uses a lot of radio interface signalling, until the Multimedia Service capability of both subscribers and their user terminals is investigated and responded to both user terminals and their users.

21 Claims, 6 Drawing Sheets

U.S. PATENT DOCUMENTS

| | | | | |
|---|---|---|---|---|
| 7,280,832 B2 * | 10/2007 | Aholainen et al. | ............ | 455/445 |
| 7,342,919 B2 * | 3/2008 | Zhang et al. | .................. | 370/352 |
| 7,366,183 B1 * | 4/2008 | Sylvain | ................... | 370/395.61 |
| 7,369,864 B2 * | 5/2008 | Vaananen | ...................... | 455/466 |
| 2002/0044200 A1 * | 4/2002 | Leimkoetter | .............. | 348/14.01 |
| 2003/0039237 A1 * | 2/2003 | Forslow | ........................ | 370/352 |
| 2003/0108001 A1 * | 6/2003 | Roy | .............................. | 370/260 |
| 2003/0233457 A1 * | 12/2003 | Basilier et al. | ................ | 709/227 |
| 2004/0076145 A1 * | 4/2004 | Kauhanen et al. | ............ | 370/352 |
| 2005/0003822 A1 * | 1/2005 | Aholainen et al. | ............ | 455/445 |
| 2006/0189338 A1 * | 8/2006 | Unmehopa et al. | ............ | 455/518 |
| 2007/0123223 A1 * | 5/2007 | Letourneau et al. | ........ | 455/414.1 |
| 2008/0259887 A1 * | 10/2008 | Naqvi | ........................... | 370/338 |
| 2009/0116477 A1 * | 5/2009 | Belling et al. | ................ | 370/386 |

* cited by examiner

METHOD AND COMMUNICATION SYSTEM FOR AUTOMATICALLY DISCOVERING THE COMMON MULTIMEDIA SERVICE CAPABILITY

This application is the US national phase of international application PCT/SE2003/002098 filed 23 Dec. 2003, which designated the U.S., the entire content of which is hereby incorporated by reference.

FIELD OF INVENTION

The present invention relates a method, a system, a server and a computer program product for automatically discovering the common Multimedia Service Capability.

BACKGROUND

Multimedia services are foreseen to bring new revenues to the cellular operators running either or both 3G WCDMA and 2.5 G GSM networks. Since plain circuit voice will be an important source of revenue still for many years, the market is developing services 'beyond' voice. These are multimedia applications that for example includes a normal voice call but add another media in parallel to that speech call, so that the two mobile users can both talk and visually share another media at the same time. This shared media may be a still image, a 1-way live video, text or game. This type of shared services we herein call Shared Multimedia (SMM) services.

Shared multimedia services requires that a user terminal, e.g. a mobile phone, is capable of running both a standard circuit switched voice call and a packet switched IP session at the same time, besides hosting the client that makes up the application logic.

A highly wanted feature by operators is that mobile users can e.g. visually see from their phone display, which—if any, Shared Multimedia services that are applicable within the ongoing voice call. If the remote user and the calling user both have the capability to use one or several shared multimedia services, one or several icons could be enlightened in the display of both user's mobile phones. This type of capability check we herein call the shared multimedia capability discovery process.

However, the de-facto capability discovery solution discussed currently in standardisation, is oriented around letting the mobile phone initiate a packet switched based mobile capability check towards the remote mobile phone, just after the voice call has been established. This means that a capability discovery check will take place over the radio interface for all mobile-mobile calls, irrespective of whether or not the remote user has the SMM capability.

The problem lies with finding a mobile capability discovery method that is optimised from a radio resources perspective. Hence, the capability discovery process and results should only be passed over the radio interface when absolutely necessary and unavoidable. Thus, the capability discovery mechanism shall not be invoked in mobile-to-non-mobile voice calls and it shall not be invoked for not SMM-capable mobile phones or for users who are not allowed to use the service even though their mobile phones has the capability technically.

A user terminal uses a packet-switched IP session to send a capability query message from the initiating terminal to the other terminal. The packet switched IP session uses radio resources. This means that a query has to be initiated in the beginning of every phone call to determine if one of the two terminals supports SMM. The probability that both terminals support SMM will however be very low for many years. Therefore, a lot of radio traffic over the capacity limited radio interface will be generated unnecessarily.

Thus, one object is to provide a method and a system for Multimedia Capability discovery that avoids unnecessary use of the radio interface and resource.

Yet another object is to provide a solution to the problem to discover if a called User terminal supports Shared Multimedia service if the service is based on other technologies than IP multimedia subsystem (3GPP IMS), for example MMS technology.

SUMMARY

The technology described below avoids unnecessary use of the radio interface and is based on a network storage, which is accessible without registration to find out about the calling as well as the called user's multimedia capabilities during a voice call. If there is a positive capability discovery result out of this for both users, the system will send a message to each of the two user terminals that they should notify the users e.g. by displaying an icon above a soft button. It can be that the terminal displays a shared multimedia-Image icon, if this was the only commonly supported capability of both users, up to a whole range of more or less complicated SMM services. Accordingly, there is no need for establishing a packet switched session, which uses a lot of radio interface signalling, until the Multimedia Service capability (MMCap) of both subscribers and their user terminals is investigated and responded to both user terminals and their users.

Consider the following steps and means for supporting and performing the steps of:
- notifying a network storage (TCdb), wherein user terminal Multimedia capability is stored, by sending a capability request concerning the user terminals of the calling party and called party, when a trigger indication has been generated by the circuit switched network;
- analyzing the response comprising the requested Multimedia Service Capabilities;
- responding to said user terminals information regarding matching Multimedia Capabilities, if at least one matching service is found.

The packet switched session is not established until said steps are performed.

One advantage is Multimedia Capability discovery that avoids unnecessary use of the radio interface and radio resources.

A further advantage is that the end-user gets clear information whether or not a shared multimedia application can be utilized in a mobile-to-mobile voice call or not.

Yet another advantage is the ability to request another User terminal if it supports Share Multimedia service based on MMS technology.

DETAILED DESCRIPTION

Figure 1:
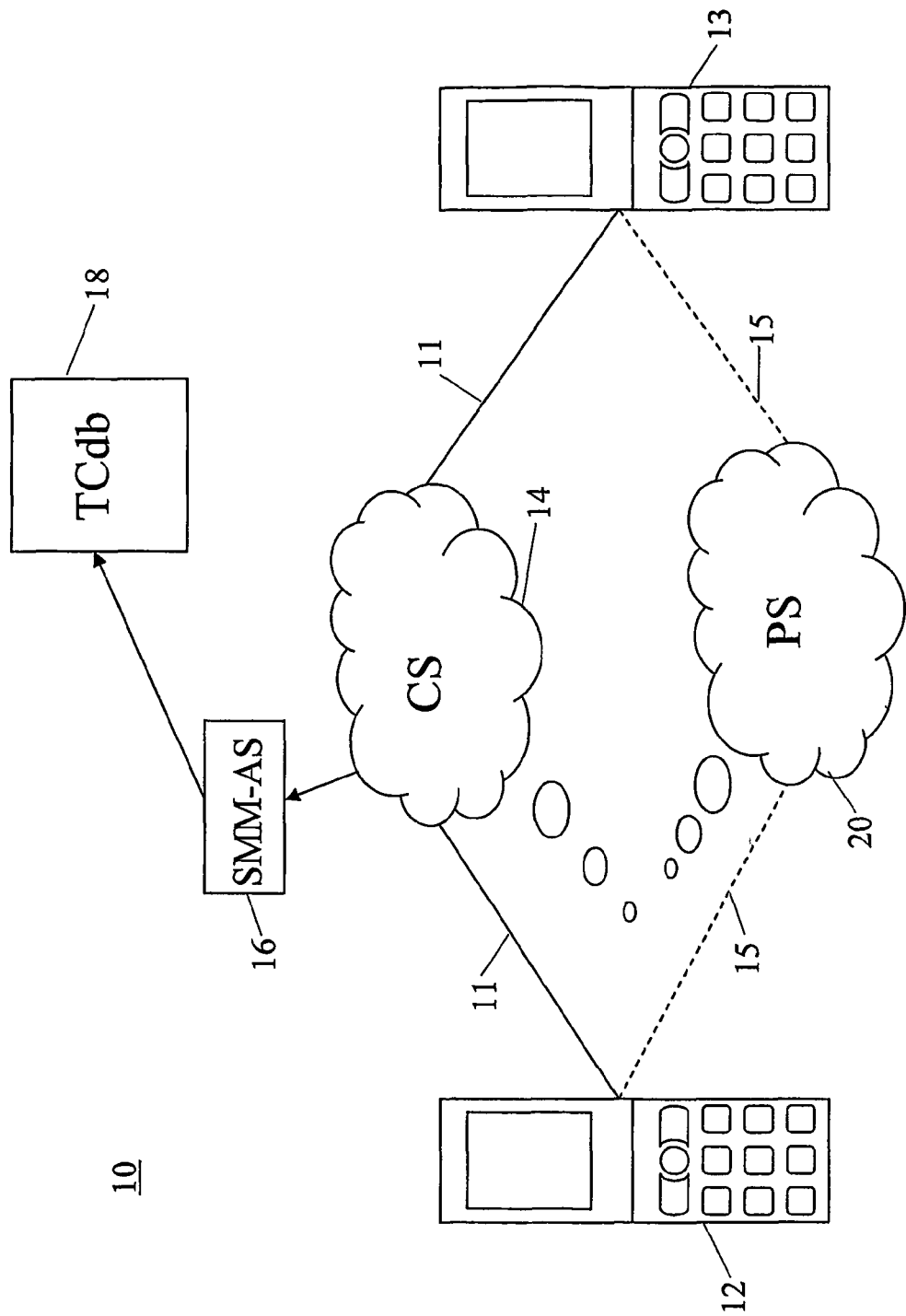
FIG. 1 is a schematic block diagram illustrating a system for Multimedia Capability Discovery.

FIG. 1 is a schematic block diagram illustrating an embodiment of the system 10 for Multimedia Capability Discovery Subsystems of the system 10 will be discussed in more detail in connection to the following FIGS. 2 and 3.

As stated above, SMM (Shared multimedia) services requires that a user terminal 12, 13, e.g. mobile phone, is capable of running both a standard circuit switched voice call (via interfaces and connections 11) and a packet switched IP session (over the connections 15) at the same time, besides hosting the client that makes up the application logic for the SMM service. A circuit switched network 14 for mobile radio telecommunication based on any standard supporting Shared Multimedia services, e.g. 3G WCDMA and 2.5 G GSM, includes at least one Shared Multimedia Application server 16.

Two users will not be able to use the SMM service, if both the user terminals 12, 13 do not support the SMM service. A SMM session therefore starts with an investigation of the calling party's and the called party's SMM capability. According to a preferred example embodiment, the system 10 is provided with a network storage 18 comprising a Terminal Capability database TCdb. It is not important where the TCdb 18 is located; it can for example be located in either the Circuit switched network CS or the Packet Switched network PS. The database TCdb 18 may be provided by one or several mobile radio communication operators or other operators providing communication services to subscribers. The network storage 18 may be any storage medium being readable, writable, operated and handled by a server or other computer device. The database TCdb stores information regarding which Multimedia services that are available for a user or subscriber and the subscriber's user terminal 12, 13. The information in the TCdb 18 may be inserted and updated in different ways. Information about a user terminal 12, 13 capability may be inserted by the network operator. Alternatively, the information, i.e. IMEI (International Mobile station Equipment Identity) can be extracted from PDP context activation procedure to a packet switched network 20 and be used for deducing user terminal capability. Another alternative is to use the UAProf (User Agent Profile) information from a packet switched session, at some point in time, to update the TCdb.

The Terminal database TCdb is provided with means for handling, sorting, reading and updating said database information. TCdb is provided with means for receiving Capability queries, means for reading the stored database information by using subscriber IDs e.g. the E.164 numbers, and means for sending a Capability result for each E.164 number back to the questioning entity, e.g. an application server. The TCdb comprises a computer or processing means (not shown), e.g. a CPU (Central Processing Unit), micro-processor, PC (Personal Computer) etc, and connected data storage memories for storing data and software program code to be executed by said computer or data processing device. The means for receiving Capability queries, means for reading the stored database information by using the E.164 numbers, and means for sending a Capability result for each E.164 number back to the questioning entity, said means is preferably implemented as software program code to be executed by said computer or data processing device.

Different automatic methods for finding said database may be used, e.g. GUP which is a 3GPP (3rd Generation Partnership Project) technique and architecture. The most efficient method to use depends on where the database is situated and in which kind of network the database is provided and is free to choose for designers of network and system. Instead of one network storage, the system may comprise many sub-storages, i.e. Sub-TCdbs.

An Application server for handling Shared Multimedia service SMM-AS 16 is run on a computer or processing means (not shown), e.g. a CPU (Central Processing Unit), micro-processor, PC (Personal Computer) etc, and connected data storage memories for storing data and software program code to be executed by said computer or processing means. The application server SMM-AS 16 comprises means for searching and finding a Terminal Multimedia Capability Database TCdb and send a Multimedia Capability query to said TCdb. The SMM-AS 16 further comprises means for notifying the network storage 18 (TCdb) by sending a capability request, i.e. said Multimedia Capability query, concerning the calling party and called party. The SMM-AS 16 also comprises means for analysing the received response comprising the requested Multimedia Service Capability. Furthermore, the SMM-AS 16 is provided with means for responding to said user terminals information regarding matching Multimedia Capability. The information may be sent by transmitting a WAP (Wireless Application Protocol) Push, or an SMS (Short message Service), or a message using any kind of radio bearer, to each user terminal 12,13. All above listed means residing in the SMM-AS 16 are possible to implement as program software code executable in said computer or processing means.

In the following described embodiments, Intelligent Network IN technology is used for realizing some of the functions in the invented method and system. IN technology is not the only possible technology when implementing the invention and should therefore not be regarded as a limitation.

For initiating an automatic SMM-AS request for common Multimedia Capability of two user terminals 12,13 to the TCdb, a special trigger has to be generated by the circuit switched network CS, i.e. the mobile radio telecommunication, when a trigger event occurs in the network 10. Preferable events may be that a voice call is set-up between a calling party A and a called party B, or a voice-call answer notification is received from the called party B. This is a standard function in radio telecommunication and different triggers are possible to generate for different special purposes in and by a SSP (Service Switching Point) node (22 in FIG. 2) or in a node combining MSC/SSP (Mobile Switching service Centre/Service Switching Point) functions. The MSC/SSP 22 is provided with means for receiving IN-Category, means for registering voice call set-ups and means for sending an IN-Trigger, i.e. request trigger, that can contain information, e.g. E 164 numbers for the calling and called subscriber A,B, about the voice call set-up, or, alternatively, for sending information about the answer of the called subscriber to the home SCP node 26 of the calling party.

The following mentioned SMM services, the IN services and the WAP Push services are provided to the user terminals 12,13 by the network operator.

Figure 2:
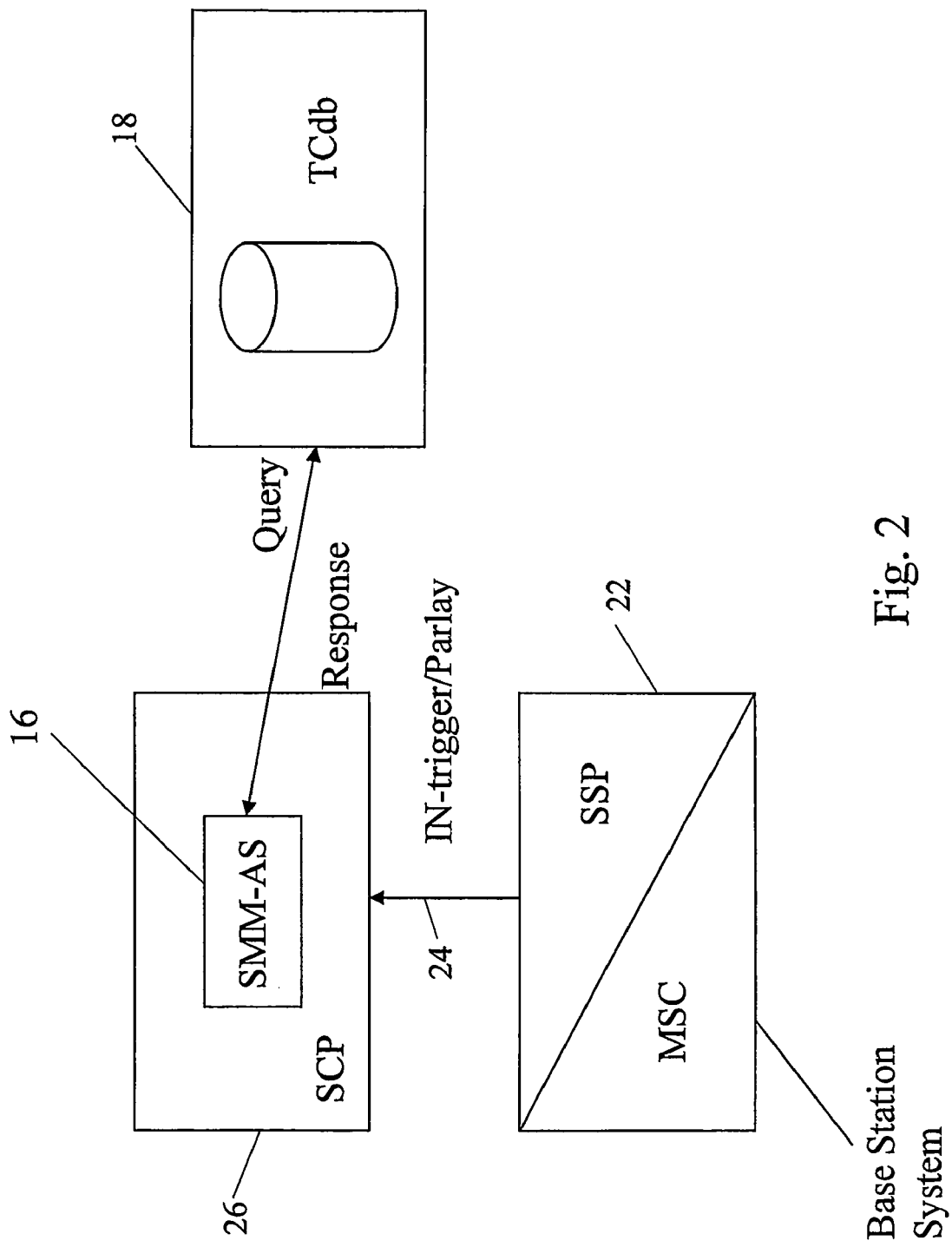
FIG. 2 is block diagram schematically illustrating a preferred example embodiment of parts in FIG. 1 during the interval from the trigger generation to the analysis of the TCdb response of the process for discovering the Multimedia capability.

A preferred embodiment of parts of the system in FIG. 1 is schematically illustrated in a block diagram in FIG. 2. Those parts interact to discover the Multimedia capability during the interval from the trigger generation to the analysis of the TCdb response. The illustrated part of the system 10 comprises a node MSC/SSP 22 (but MSC and SSP may be separated in one node each) belonging to a domain of the Mobile radio telecommunication network 14 that is visited by the calling party A. When the user makes IMSI Attach in the MSC 22 Service Area for the first time, the originating IN-category is sent to the visited MSC/SSP 22 where the user currently is roaming, either within the home network or in a foreign operator's network. The SSP sends the IN-trigger over an interface 24 to a home SCP node 26, i.e. Service Control Point node, belonging to the Intelligent Network IN of an home domain of the calling party A. This interface 24 between the MSC/SSP 22 and the home SCP 26 can be any of the standardized IN protocol, such as CAP (CAMEL Application Part) or CS-1. The E.164 numbers of both the calling user terminal A and the called/connected user terminal B are included. The receiving home SCP 26 will forward the trigger and subscriber identifiers to the SMM-AS 16, which is integrated with the node 26.

There is no need for the SMM-AS 16 to be located in the SCP node. If the SMM-AS is not located in said node, a function in the receiving home SCP 26 generates a message e.g. an Originated-Call notification or an Answer-notification message to the SMM Application Server 16. The E.164 numbers of both the calling user terminal A and the called/connected user terminal B are included in the notification message.

Optionally, when the SMM-AS 16 is alerted or has received the SCP notification, the SMM-AS can be programmed to confirm back to the SCP 26 that it has successfully been received. The originating SCP 26 can then respond back to the serving MSC/SSP 22, which continues the call set up.

The SMM-AS 16 interprets the IN-Trigger (or notification message) and generates a request for the Multimedia capability MMCap of the calling part A and the called part B. The Application server is able to address and send the request to the generic database server TCdb and receive a response from said database. Hence, SMM-AS 16 is provided with means for finding correct Terminal Capability database (TCdb), addressing and transmitting a Capability query to the TCdb. The TCdb 18 is programmed to perform ordinary database steps like:
  Receiving the Capability queries;
  Reading the stored database information corresponding to each of said E.164 numbers and create a Capability result for each of said numbers;
  Sending the Capability results to the questioning SMM-AS node.

The SMM-AS 16 analyzes the Capability results and to try to match the different capabilities, MMCap12 and MMCap13, and prepares a matching multimedia response to be sent to the calling 12 and called user terminal 13, respectively. Therefore, the SMM-AS 16 node is provided with means for analyzing by comparing the pair of Capability results for at least one matching capability. Especially interesting parts of the system 10 in FIG. 1 during for sending of the matching multimedia response to the two user terminals 12,13 is schematically illustrated in a block diagram in FIG. 3.

Figure 3:
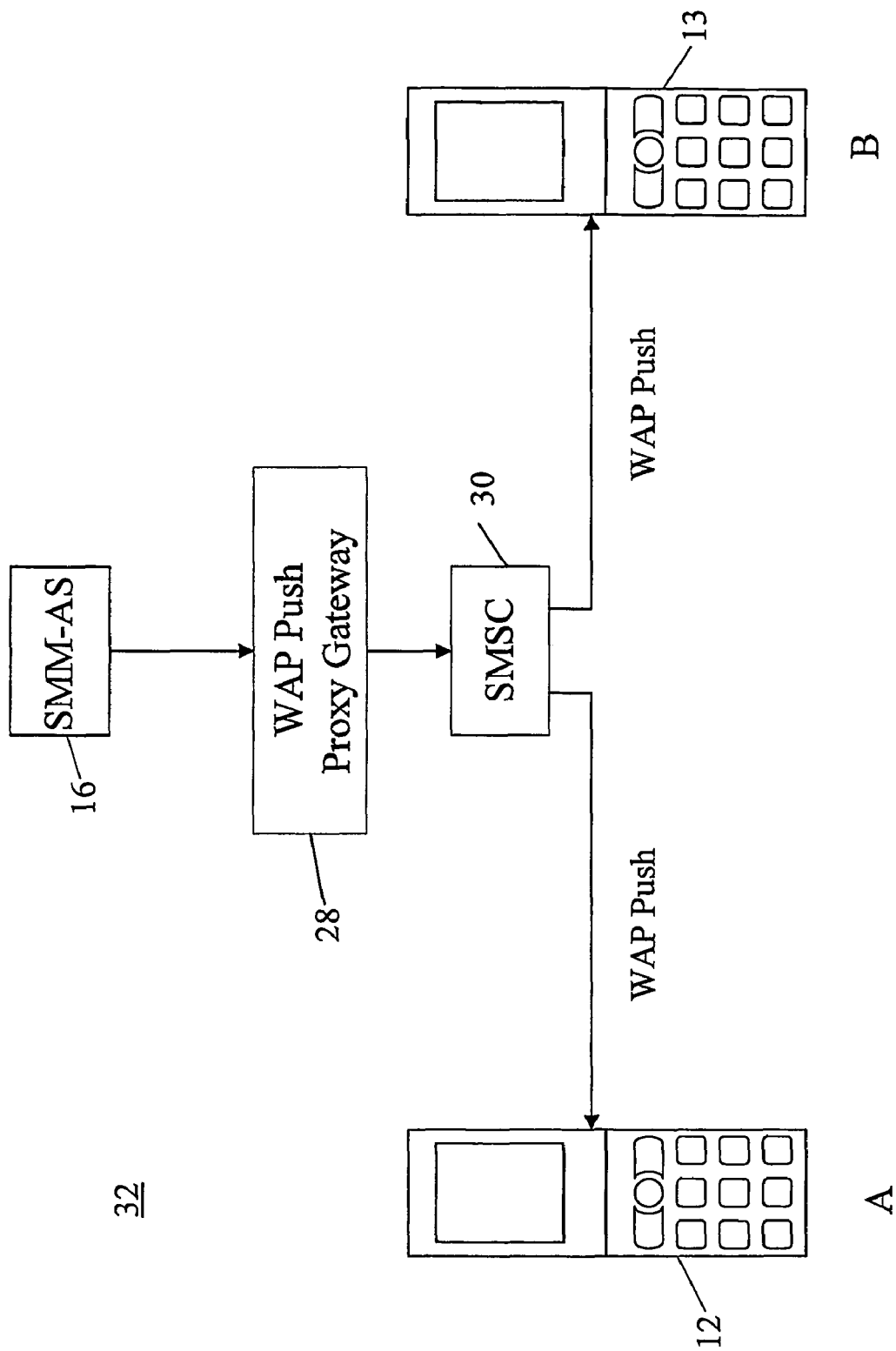
FIG. 3 a block diagram schematically illustrating a preferred example embodiment of parts in FIG. 1 for sending of the matching multimedia response to the two user terminals.

According to FIG. 3, the SMM-AS 16 also functions as a WAP Push Initiator, here defined as means for performing the step of responding to said user terminals information regarding matching Multimedia Capability MMCap. The information is sent via an Push Access Protocol to a WAP Push Proxy Gateway 28 that is forwarded to a Short Message Service Centre, SMSC, 30 transmitting a WAP_Push message to both user terminal 12,13. The step of responding information to the user terminals 12,13 is preferably performed simultaneously by sending a message to each of the user terminals 12,13 using protocols, services interfaces, and software entities that provide means to push data to user agents in WAP clients in the user terminals 12,13. The WAP Push is not transferred via the packet switched network. WAP Push Architecture is earlier known from e.g. the document "WAP Push Architectural Overview", version 3 Jul. 2001, WAP-250-PushArchOverview-20010703-a, available on http://www.wapforum.org/.

The information of said WAP_Push is interpreted by a User Agent stored in each of said user terminals 12,13. A User Agent is a software application, that is stored in a user terminal and provides the user with a special kind of service. The User Agent can for example enlighten the Icon on the terminal display after having received said WAP Push message.

Figure 4:
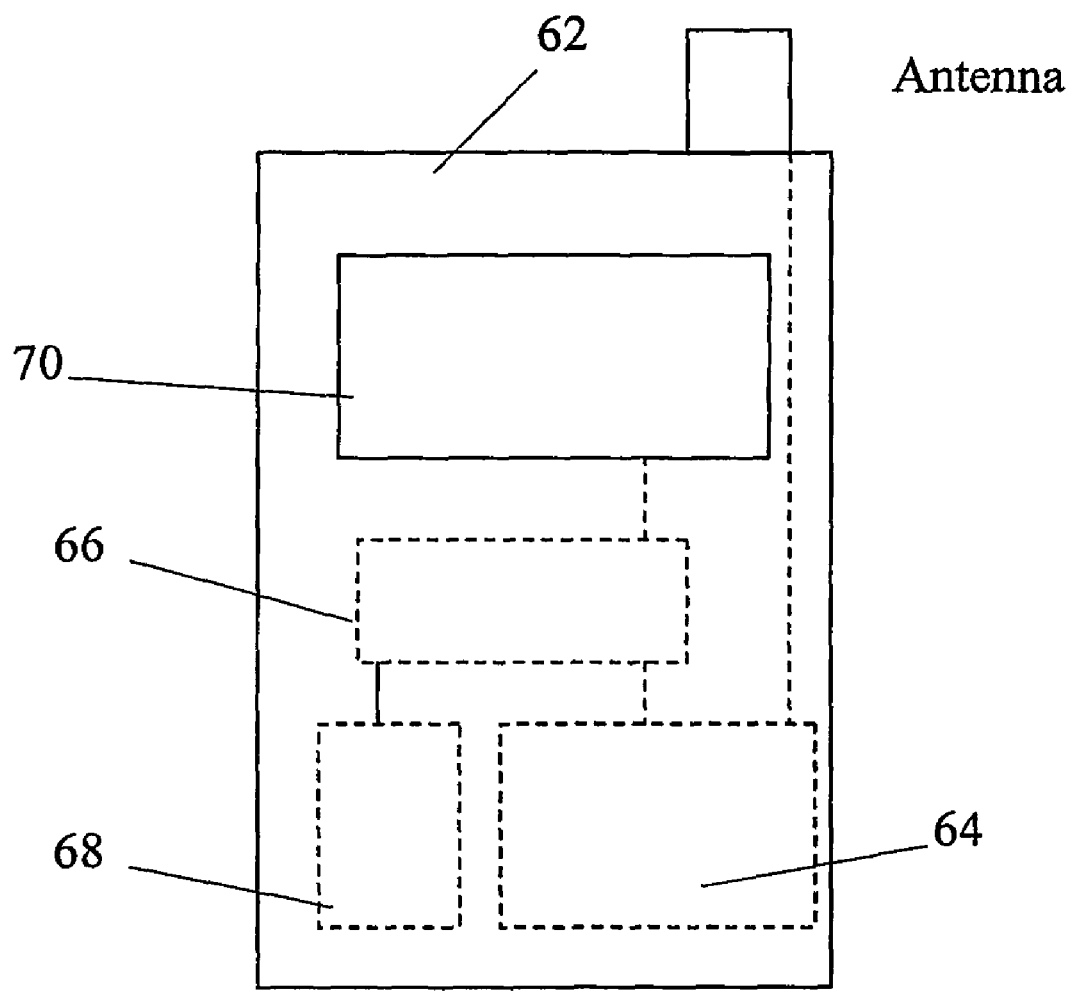
FIG. 4 is a block scheme illustrating very schematically a terminal or mobile phone.

FIG. 4 is a block scheme illustrating very schematically a User terminal 60, here illustrated as and denoted a terminal or a mobile phone. This terminal 60 comprises a housing 62 within which a radio unit for signalling, and transmitting and receiving voice calls and data information over the air interface to a mobile radio telecommunication network. The radio unit 64 is connected to and controlled by a control unit 66, which is a computer or processing means (not shown), e.g. a CPU (Central Processing Unit), micro-processor, PC (Personal Computer) etc. As stated above, shared multimedia services requires that a mobile phone is capable of running both a standard circuit switched voice call and a packet switched session at the same time, besides hosting the client that makes up the application logic. Therefore, a memory storage means 68 is connected to the control unit 66 for storing data and software code to software program for controlling the control unit and the terminal. The illustrated memory storage means 68 represents many different kinds of storages like ROM, RAM, EPROM, etc, usually used in terminals on the market. In said memory storage means 68 is loaded and stored User Agents for different services like WAP Push messages, MMS, Multimedia Capability, SIP messages, etc. User agents software programs that is automatically alerted when the control unit identifies a corresponding incoming service. The terminal 60 is also provided with a Man-Machine-Interface, MMI, a display 70 connected to and controlled by the control unit for showing different information. The display 70 may be able to show soft button that when touch can activate a software application stored in said memory storage means 68. The different unit of the terminal 60 is powered by at least one battery (not shown).

Figure 5:
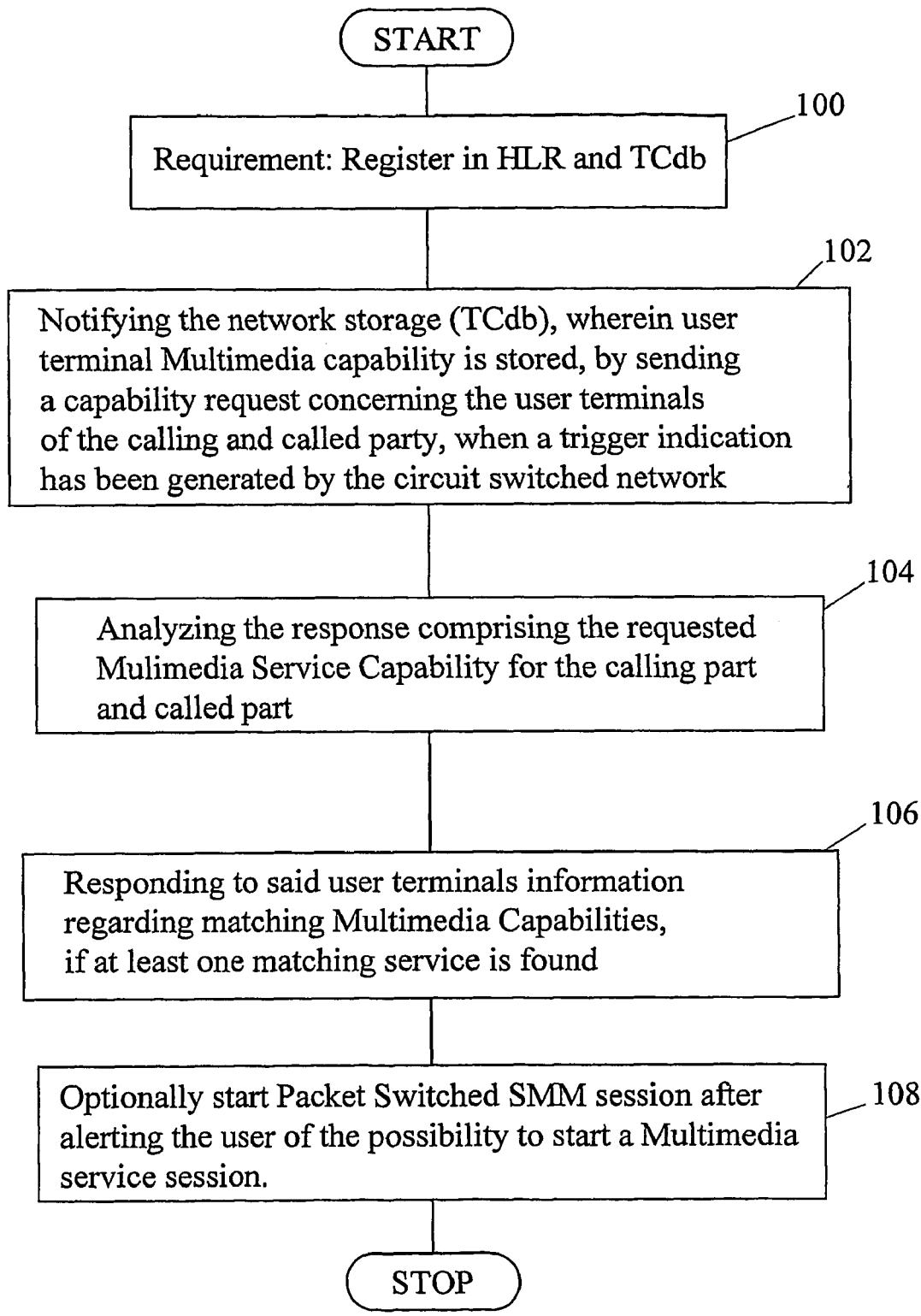
FIG. 5 is a flow chart illustrating a preferred example embodiment.

A preferred embodiment for automatically discovering the common Multimedia Service Capability of at least two subscribers will in the following be described with reference to FIG. 5, which is a flow chart illustrating a preferred embodiment of the invented method.

Some standard initial procedures, step 100, has to take place to achieve the conditions and requirements for the method to work properly. The operator has to set in the HLR (Home Location Register) an originating IN category on the users that are subscribing to any SMM service, e.g. SMM-Image. At power on, the user makes an IMSI Attach (International Mobile Subscriber Identity Attach which is a standard step described in the Standard specifications for GSM etc) in the visited MSC Service area for the first time. The HLR sends the originating IN-Category to the visited MSC/SSP where the user is roaming (either within the home network or in a foreign operator's network) currently. The database TCdb, storing information regarding which Multimedia services that are available for a user or subscriber and the subscriber's user terminal 12, 13, has to be updated. The information in the TCdb 18 may be inserted and updated in different ways. Information about a user terminal 12, 13 capability may be inserted by the network operator. Alternatively, the information, i.e. IMEI (International Mobile station Equipment Identity) can be extracted from PDP context activation procedure to a packet switched network 20 and be used for deducing user terminal capability. Another alternative is to use the UAProf (User Agent Profile) information from a packet switched session, at some point in time, to update the TCdb.

When a voice call is initiated over a circuit switched network (14) by a terminal 12 to another terminal 13, following steps will be performed for automatically discovering the common Multimedia Service Capability of two user terminals (12,13). The method comprises the of:

notifying a network storage (TCdb), wherein user terminal Multimedia capability is stored, by sending a capability request concerning the user terminals (12,13) of the calling party and called party, when a trigger indication has been generated by the circuit switched network (Step 102);
  analyzing the response comprising the requested Multimedia Service Capabilities (step 104);
  responding to said user terminals (12,13) information regarding matching Multimedia Capabilities, if at least one matching service is found (step 106);
  alerting the user of the possibility to start a Multimedia service session if at least one matching SMM service is found (step 108).

Naturally, the different elements of the system have to perform different standard steps and functions for handling the instructions and information signalled in the system discussed in FIGS. 1, 2 and 3. The characteristic steps have to interact with the standard steps and functions of the system, which steps will be discussed and described in the following.

The method starts when a subscriber makes a voice call set-up procedure:

Setting-up a voice call;
  Analyzing IN-category for the caller's home (IN-)SCP address in the visited MSC/SSP node. Said steps are regarded as well-known standard steps in a circuit switched network. As an alternative, the step of setting-up a voice call can be replaced by receiving a voice call answer (indicating that the called party has answered).

The next step performed in the system is the generation and sending of indication information, e.g. IN-Trigger, Generating and sending an indication information from the visited MSC/SSP 22 node to the caller's SCP node 26 (home IN-SCP 26);
  Receiving indication information in the caller's SCP node 26, the indication information comprises the called and the calling parts E.164 numbers;
  Generating and passing the indication information to the SMM-AS 16.

Thus, when the receiving SCP node 26 of the caller gets the indication information, either as an IN-trigger or by use of Parlay technology (see www.parlay.org), generated by the MSC/SSP 22, the SCP 26 generates and passes the indication information to the SMM-AS 16. The E.164 numbers of both the calling and the called/connected user are sent to the SMM-AS 16, which will generate capability queries regarding the called and the calling parts E.164 numbers.

Optionally, as stated previously in this description, the SMM-AS 16 can confirm back to the SCP 26 that it has successfully received trigger indication to generate capability queries regarding the called and the calling parts E.164 numbers. The originating SCP 26 can then respond back to the serving MSC/SSP 22, which continues the call set up.

The next step performed by the SMM-AS 16 is the step of sending a capability request concerning the user terminal 12 of the calling part A and user terminal 13 of the called part B to the network storage TCdb 18. SMM-AS 16 can proceed by issuing either a general capability query, or a specific Shared Multimedia capability query, towards the Terminal Capability database 18 of each A- and B-subscriber (terminals 12, 13). It is understood that the SMM-AS comprises means for obtaining the address to the Terminal Capacity database TCdb.

The steps performed by the TCdb 18 are ordinary database steps:

Receiving the Capability queries;
  Reading the stored database information corresponding to said E.164 numbers and create a Capability result for each of said numbers;
  Sending the Capability results to the questioning SMM-AS node.

After the reception of the Capability results, SMM-AS 16 perform the step of analyzing the response comprising the requested Multimedia Service Capability:

Analyzing by comparison of the pair of SMM Capability results for at least one matching SMM capability service (step 104).

When the analysis is ready, the SMM-AS 16 performs the step of responding to said user terminals 12,13 information regarding matching Multimedia Capability (MMCAP), if at least one matching service is found (step 106);

If no common capability for the two compared capability results is found, no capability response is sent;
  If at least one common Multimedia Capability is identified, send a Capability response comprising said capability or capabilities as a WAP Push message to said user terminals 12,13.

In the user terminals 12, 13, following steps will be performed:

Receiving the WAP push message and load it to the correct User Agent in the user terminals;
  Alerting the user of the possibility to start a Multimedia service session (step 108), e.g. enlightening at least one Multimedia Icon on a display device of each of said user terminals, if the information regarding the matching services is received.

It will only be possible for the User Agent in the user terminals to conduct the following registration steps and the enlightening of the SMM Icon, if the capability response, e.g. as a WAP Push message, is received:

1. Enlighten the SMM icon or corresponding SMM indicator.
  2. PDP (Packet Data Protocol) Context Activation.
  3. Start SIP registration.
     In case of a MMS based Shared Multimedia, this step will not be automatically activated.

The great yield in radio resources in comparison to the procedure wherein-said registrations always will be performed by default when each user makes an ordinary voice call set-up is the fact that the registration steps—PDP Context Activation and SIP registration—will not be initiated until it is investigated and determined that the two user terminal can use the same, i.e. matching, Shared Multimedia services. Hence, there is no need to initiate a packet switched session and to send the capability request through the packet switched network.

When the user sees the SMM-image icon or equivalent, the user may press for example a soft button underneath an SMM-icon, to send an image e.g. in JPEG format, towards the remote user of the ongoing voice call.

Figure 6:
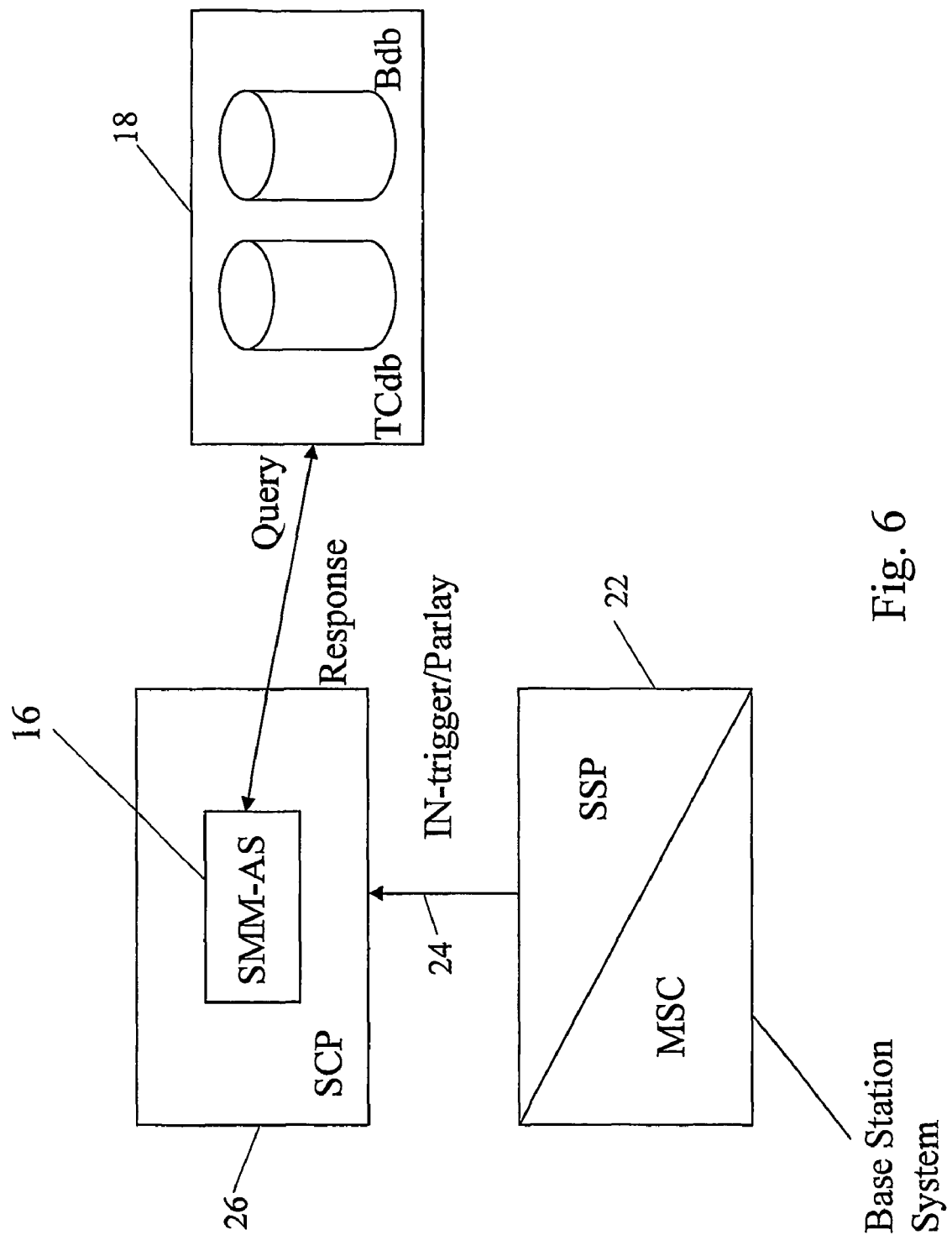
FIG. 6 is block diagram schematically illustrating another example embodiment of the system in FIG. 2.

FIG. 6 is a block diagram illustrating further one embodiment that is discussed in connection to and illustrated in FIG. 2. The system in FIG. 6 comprises an additional database in the network storage 18. Said database is a bearer database Bdb, which is continuously updated with technical network information. The database Bdb contains at least bearer information for different networks. According to this embodiment, the capability request concerning the user terminals sent by the SMM-AS 16 to the network storage 18 will also include a request for bearer information regarding the networks in which the user terminals 12, 13 are roaming. The capability results for the terminals comprise radio bearer information concerning the networks in which the user terminals 12, 13 are roaming. When the SMM-AS 16 is analyzing the response comprising the requested Multimedia Service capabilities (step 104), the analysis will also include a check if the terminals 12, 13 are roaming in networks having the kind of radio bearer supporting simultaneous connection to packet switched and circuit switched networks. Although both terminals have matching multimedia capability, one of the terminals, or both, may be roaming in a network that is not provided with the special kind of radio bearer needed for that kind of service. In those cases, the SMM-AS 16 will not respond to said user terminals (12,13). However, if terminals 12,13 have matching multimedia capability, and both terminals are roaming in a network that is provided with the bearer needed for said kind of service, then the SMM-AS 16 will respond to both user terminals (12,13) that they have matching multimedia capability.

In FIG. 6, both databases TCdb and Bdb are stored in the same network storage 18. However, said databases TCdb and Bdb may be stored in separate storages. The SMM-AS will then split the capability request into two requests and send one request to the address of TCdb and the other to the address of the Bdb.

Although IN-technology has been used in the embodiments above, other technologies may be used instead, for example Parlay technology (see www.parlay.org).

For alerting the user of the terminal, means for generating a characteristic sound, or vibrations, etc, may be used instead of an icon.

In the described embodiment above, the E.164 number have been used as an subscriber identity, but other subscriber or terminal related information, such as IMEI, IMSI, may be used as well as identity for a subscriber.

The technology also includes a server provided in a node of the claimed system. The server comprises means for notifying the network storage (18) by sending a capability request concerning the user terminals of the calling party and the called party, when a trigger indication has been generated by the circuit switched network, means for analyzing the response comprising the requested Multimedia Service Capability and means for responding to said user terminals information regarding matching Multimedia Capability, if at least one matching service is found. Implemented by means of a computer program comprising the software code means for performing the steps of the method. The claimed server comprises different means for performing different functions. Said functions is possible to implement as computer executable software being adapted to run at a computer or other processing means.

The method may be implemented by means of a computer program comprising the software code means for performing the steps of the method. A computer program product comprising said computer executable software stored on a computer readable/usable medium, the software being adapted to run at a computer or other processing means. When said computer executable software is loaded and read by said computer or other processing means, said computer or other processing means is able to perform the steps of the method according to any of claims 1-8.

In the description, different kind of Computer or processing means are listed, e.g. CPU (Central Processing Unit), micro-processor, PC (Personal Computer), server unit, etc. Said list is not exhaustive and should therefore not be regarded as a limitation for the scope of the protection.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method for automatically discovering the common multimedia service capability of at least two user terminals when a voice call is initiated over a circuit-switched network from a first one of the user terminals handled by a calling party to the second one of the user terminals that is handled by a called party, the first user terminal is capable of running simultaneously both a circuit voice call in the circuit-switched network and a shared multimedia service session supported by a packet-switched network, the other user terminal's multimedia capability may be unknown to a user of the first user terminal, the method comprising the following steps of:
    notifying a network storage by sending a capability request concerning the user terminals of the calling party and called party when a trigger indication has been generated by the circuit-switched network;
    analyzing the response including the requested multimedia service capabilities;
    responding to said user terminals with information regarding matching multimedia capabilities and alerting users of the user terminals of a possibility to start a packet-switched shared multimedia service session only if at least one common multimedia service capability is found for the user terminals;
    wherein said notifying, analyzing, and responding steps are performed prior to the packet-switched shared multimedia service session being initiated, and
    initiating the shared multimedia service session only if at least one common multimedia service capability is found for the user terminals,
    wherein the network storage comprises a terminal capability database.

2. A method according to claim 1, wherein the network storage also comprises a bearer database.

3. A method according to claim 1, wherein the step of notifying the network storage by sending a capability request concerning the user terminals of the calling party and called party is initiated upon a trigger event based on either a set-up notification or an answer notification.

4. A method according to claim 1, wherein said notifying, analyzing, and responding steps are performed by an application server for shared multimedia.

5. A method according to claim 1, wherein the step of responding to said user terminals information regarding matching multimedia capabilities is performed by transmitting to each of said user terminals a WAP_Push message for alerting the user of the possibility to start a multimedia service session.

6. A method according to claim 5, wherein the user terminals will not start a packet switched session until said message has been received by the two user terminals.

7. A method according to claim 1, wherein the trigger indication is generated by use of IN technology or Parlay technology.

8. A system for automatically discovering the common multimedia service capability of at least two user terminals when a voice call is initiated over a circuit-switched network from a first one of the user terminals to the second one of the user terminals, the first user terminal is capable of running simultaneously both a circuit voice call in the circuit-switched network and a packet-switched session supported by a packet-switched network, the other user terminal's multimedia capability may be unknown to a user of the first user terminal, the system comprising:
- means for notifying a network storage by sending a capability request concerning the user terminals of the calling party and called party, when a trigger indication has been generated by means in the circuit-switched network,
- means for analyzing the response including the requested multimedia service capabilities,
- means for responding to said user terminals with information regarding matching multimedia capability and alerting users of the user terminals of the possibility to start a multimedia service session only if at least one common multimedia service capability is found for the user terminals, and
- means for initiating the shared multimedia service session only if at least one common multimedia service capability is found for the user terminals,
- wherein the network storage comprises a terminal capability database.

9. A system according to claim 8, wherein the network storage also comprises a bearer database.

10. A system according to claim 8, wherein the means for notifying the network storage by sending a capability request concerning the user terminals of the calling party and the called party starts when it receives an indication that a trigger event based on either a set-up notification or an answer notification has occurred.

11. A system according to claim 8, wherein the means for notifying the network storage by sending a capability request concerning the user terminals of the calling party and called party, the means for analyzing the response comprising the requested multimedia service capabilities, and the means for responding to said user terminals information regarding matching multimedia capability, if at least one matching service is found, are provided in an application server for multimedia.

12. A system according to claim 8, further comprising means for responding to said user terminals information regarding matching multimedia capabilities by transmitting to each of said user terminals a WAP_Push message for alerting the user of the possibility to start a multimedia service session.

13. A system according to claim 12, wherein the user terminals will not start a packet switched session until said message has been received by the two user terminals.

14. A system according to claim 8, wherein the trigger indication is generated using IN technology or Parlay technology.

15. A computer program product comprising computer executable software stored on a non-transitory computer readable medium, the software being adapted to run at a computer or other processing means, and wherein said computer executable software is loaded and read by said computer or other processing means, said computer or other processing means is arranged to perform the steps of the method according to claim 1.

16. A server provided in a node of a system for automatically discovering the common multimedia service capability of at least two user terminals when a voice call is initiated over a circuit-switched network from a first one of the user terminals to the second one of the user terminals, the first user terminal is capable of running simultaneously both a circuit voice call in the circuit-switched network and a packet switched session supported by a packet-switched network, the other user terminal's multimedia capability may be unknown to a user of the first user terminal, the server comprising electronic circuitry arranged to:
- notify the network storage by sending a capability request concerning the user terminals of the calling party and the called party, when a trigger indication has been generated by the circuit switched network,
- analyze the response including the requested multimedia service capability,
- respond to said user terminals with information regarding matching multimedia capability and alert users of the user terminals of the possibility to start a shared multimedia service session only if at least one common multimedia service capability is found between the user terminals, and
- initiate the shared multimedia service session only if a common multimedia service capability is found between the user terminals,
- wherein the network storage includes a terminal capability database.

17. A server according to claim 16, wherein the network storage also comprises a bearer database.

18. A server according to claim 16, wherein the electronic circuitry is arranged to notify the network storage by sending a capability request concerning the user terminals of the calling party and called party when it receives an indication that a trigger event based on either a set-up notification or an answer notification has occurred.

19. A server according to claim 16, wherein the electronic circuitry is arranged to respond to said user terminals information regarding matching multimedia capabilities by transmitting to each of said user terminals a WAP_Push message for alerting the user of the possibility to start a multimedia service session.

20. A server according to claim 19, wherein the user terminals will not start a packet-switched session until said message has been received by the two user terminals.

21. A server according to claim 16, wherein the trigger indication is generated by IN technology or Parlay technology.

* * * * *